United States Patent [19]

Chen

[11] Patent Number: 4,832,362
[45] Date of Patent: May 23, 1989

[54] GOLF BAG CART

[76] Inventor: Mike S. S. Chen, 17482 Jordan Ave., #3B, Irvine, Calif. 92715

[21] Appl. No.: 198,073
[22] Filed: May 24, 1988
[51] Int. Cl.$^4$ ............................................. B62B 1/04
[52] U.S. Cl. ................................. 280/645; 280/655; 280/47.26; 280/DIG. 6
[58] Field of Search ............... 280/652, 654, 655, 659, 280/47.18, 47.26, 47.22, 646, 38, 641, DIG. 5, DIG. 6, 47.17, 645; 403/93, 95, 348

[56] References Cited

U.S. PATENT DOCUMENTS

| | | | |
|---|---|---|---|
| D. 166,308 | 4/1952 | Grant | D34/15 |
| 2,236,053 | 3/1941 | Caron | 280/47.26 |
| 2,438,078 | 3/1948 | Sutpen | 280/655 |
| 2,714,012 | 7/1955 | Berger | 280/DIG. 6 |
| 3,304,036 | 2/1967 | Davis | 280/DIG. 6 |
| 3,510,145 | 5/1970 | Yokers | 280/47.19 |
| 3,733,086 | 5/1973 | Walkerou | 280/DIG. 6 |
| 3,784,138 | 1/1974 | Herling et al. | 248/96 |
| 4,550,930 | 11/1985 | Proffit | 280/DIG. 6 |

FOREIGN PATENT DOCUMENTS 645999  11/1950  United Kingdom ......... 280/DIG. 6

Primary Examiner—Charles A. Marmor
Assistant Examiner—Richard Camby
Attorney, Agent, or Firm—Jerry T. Kearns

[57] ABSTRACT

A cart for transporting golf clubs includes a golf bag carried by a frame mounted by shock absorbers to a pair of wheels. An odometer is provided for measuring the distance walked by an individual pulling the cart. This allows the distance of a player's shot to be easily measured. A rubber bumper is provided on the bottom of the golf bag for allowing the bag to stand in two positions without damage. An adjustable handle may be folded for storage purposes. The golf bag includes a removable holder for storing a supply of golf balls. A retractable umbrella is provided for protection of the golf bag and the golfer.

14 Claims, 6 Drawing Sheets

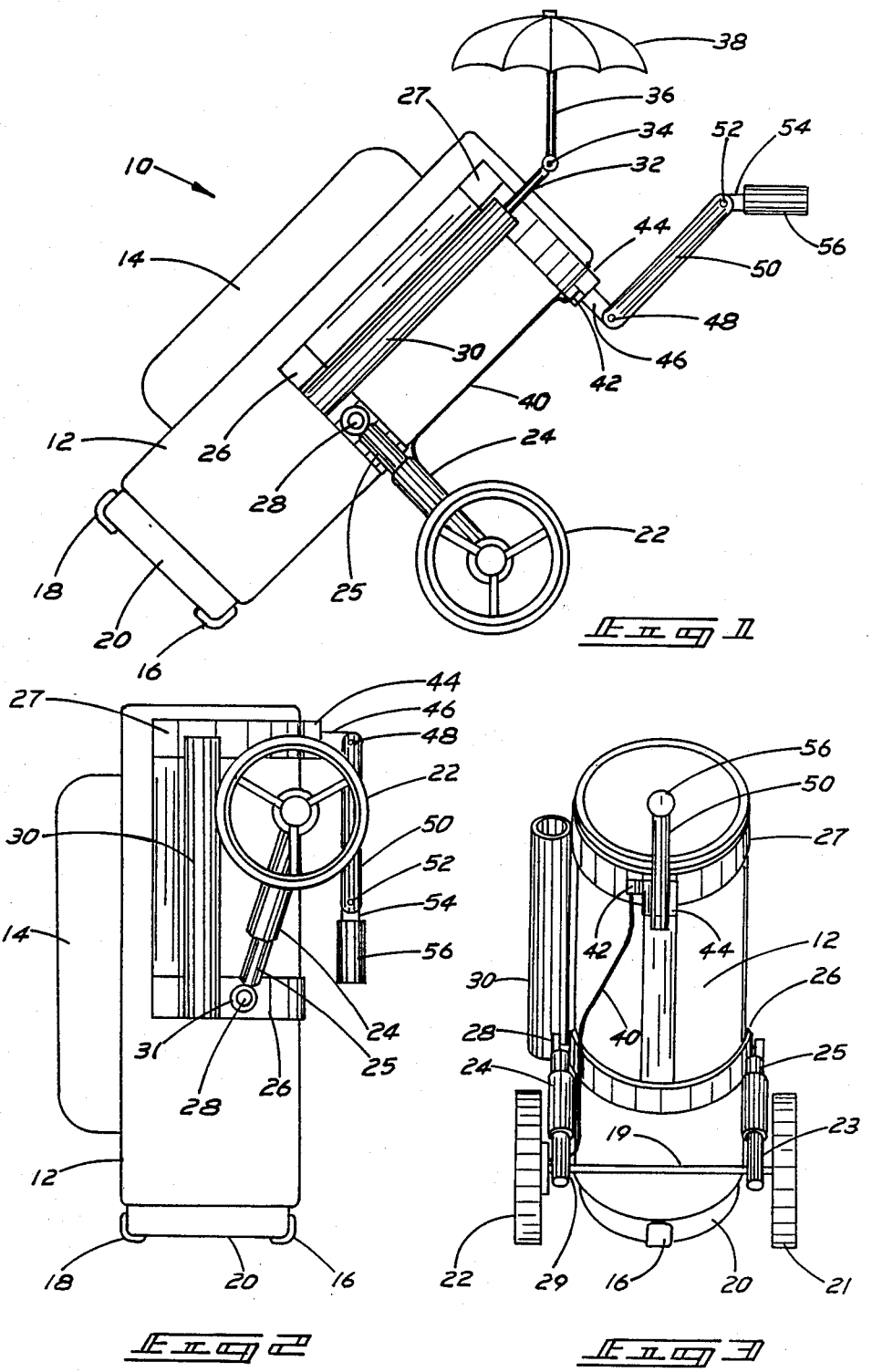

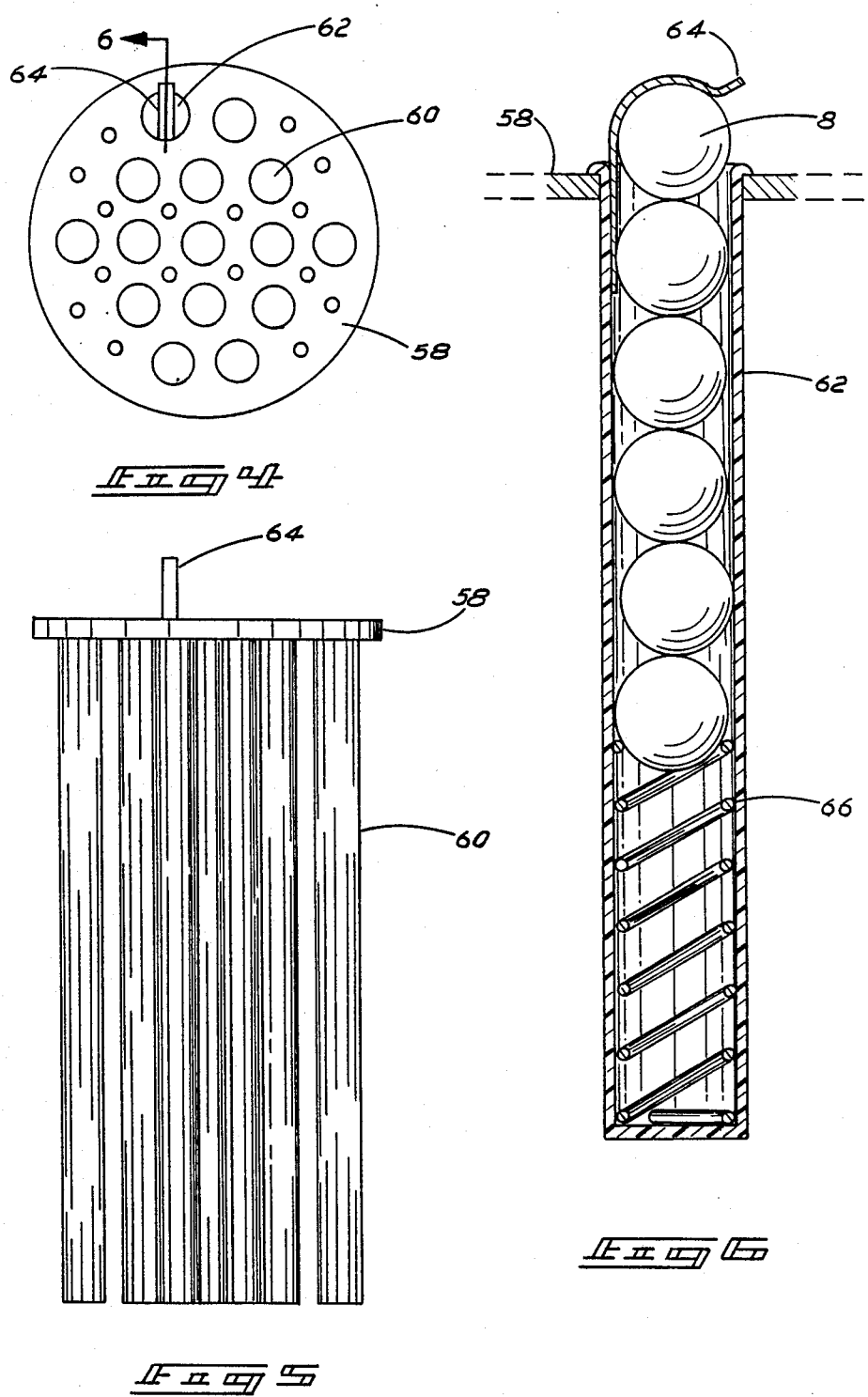

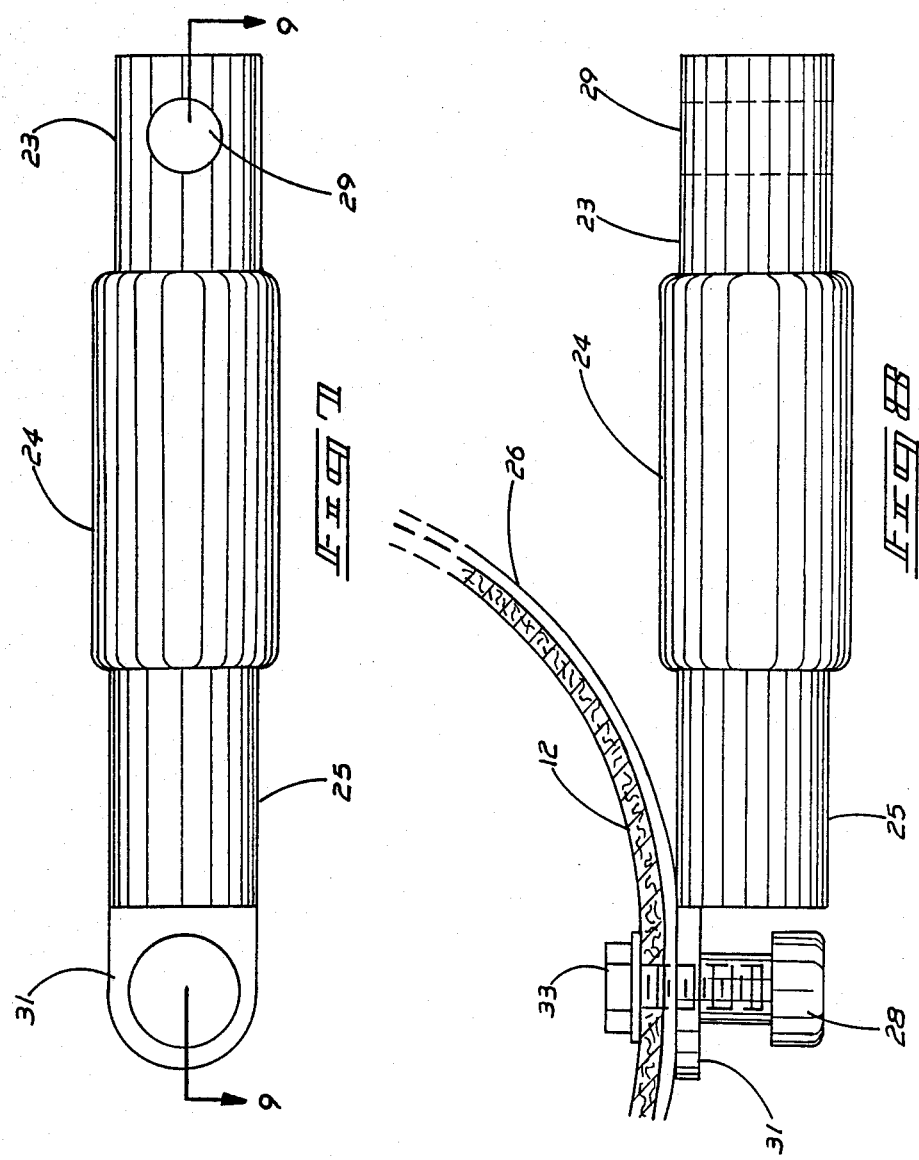

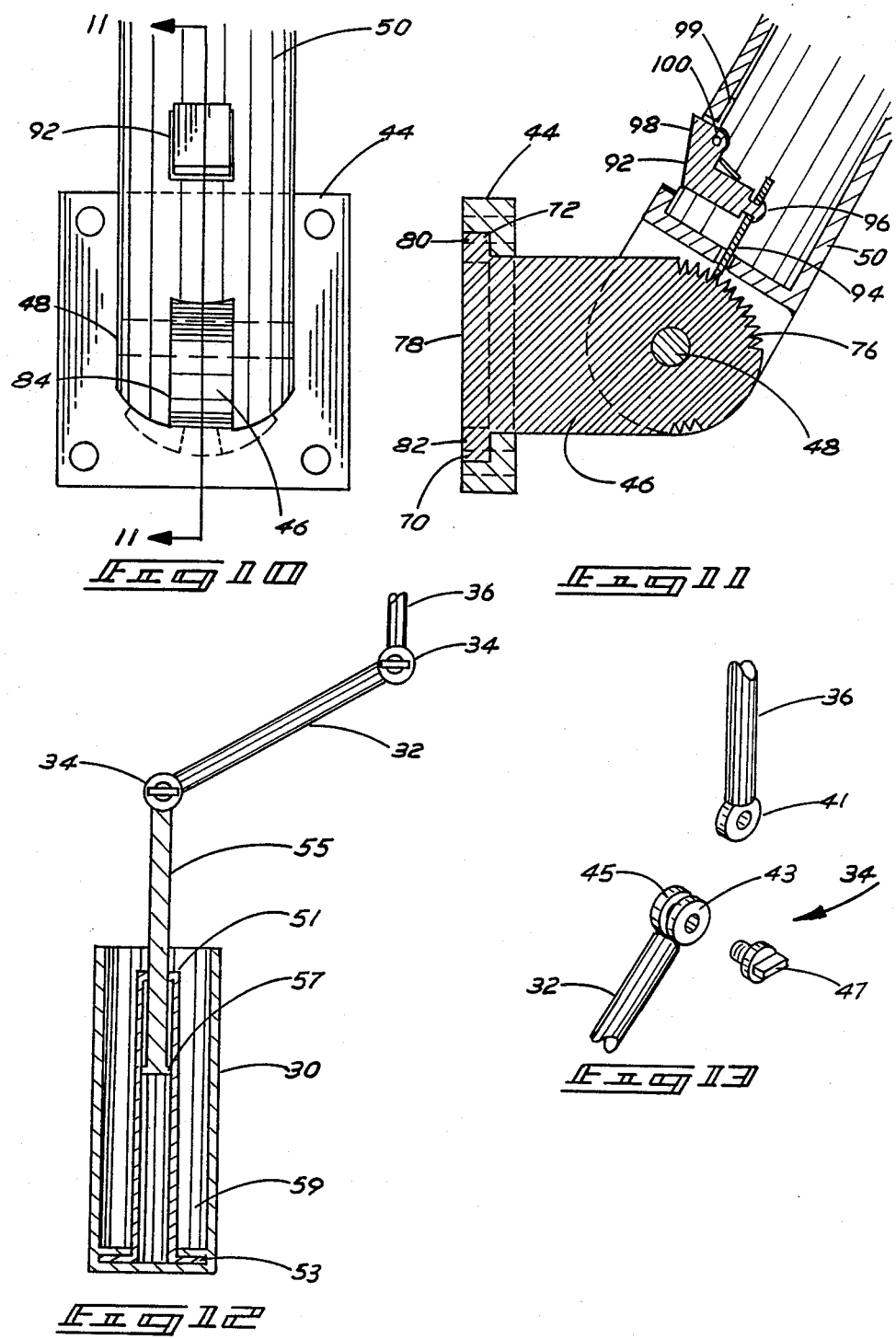

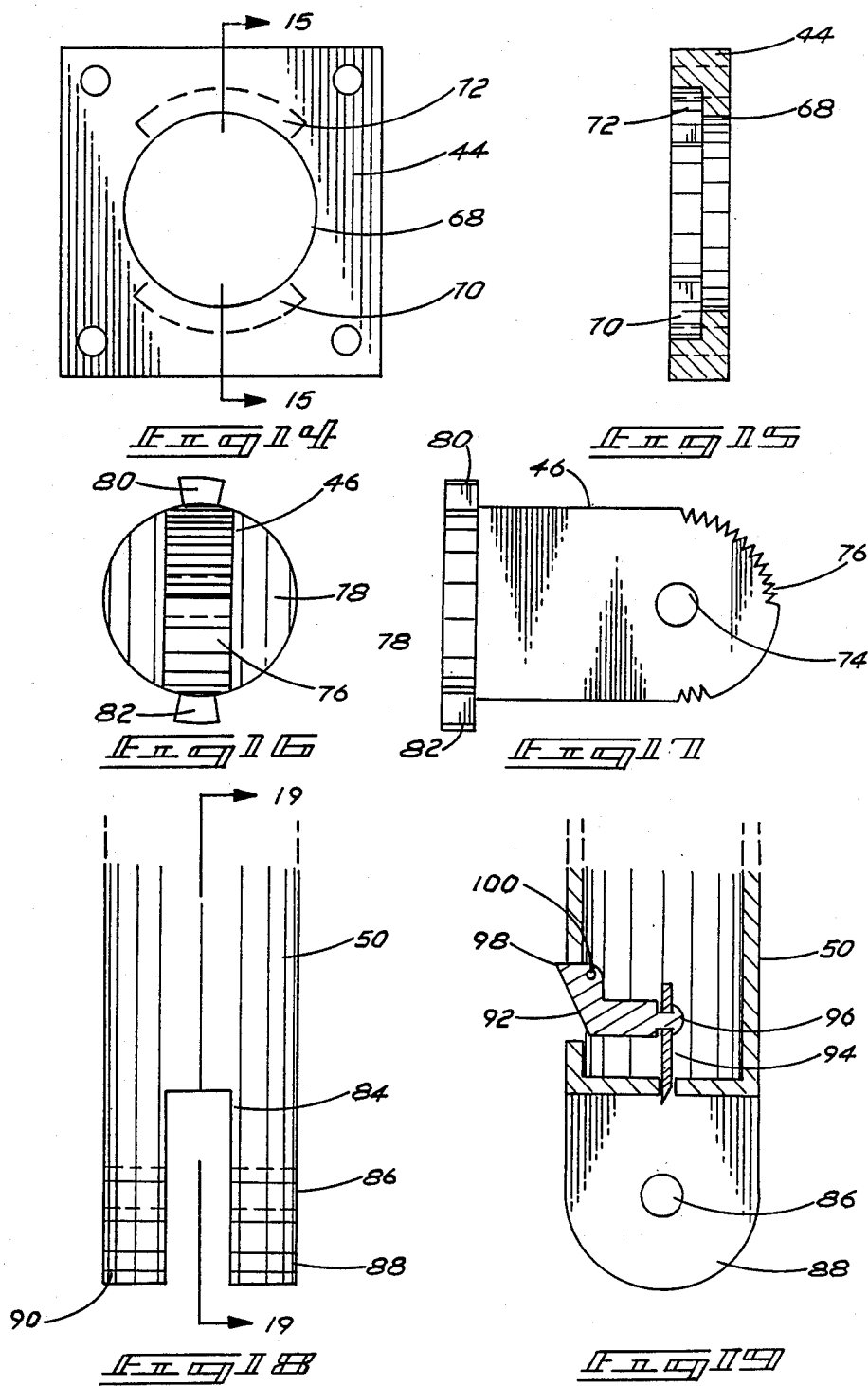

GOLF BAG CART

BACKGROUND OF THE INVENTION

1. Field of the Invention

The present invention relates to golf bag carts, and more particularly pertains to a new and improved golf bag cart. The present invention is directed to the provision of a golf bag cart of the type adapted to be pulled by a golfer. A wide variety of examples of this type of golf bag cart are known in the prior art. However, these conventional golf bag carts are typically provided with unsprung cart wheels which provide a bumpy and jostling ride to the golfer's equipment. The rough and jostling movement of these conventional golf carts is transmitted via the handle to the golfer's hand. This results in discomfort for the golfer, which inevitably produces fatigue and degrades the golfer's performance on the course. In order to solve this problem and to provide a new and improved golf bag cart with a variety of additional useful features, the present invention provides a golf bag cart with a golf bag mounted to a pair of cart wheels by shock absorbing devices.

2. Description of the Prior Art

Various types of golf bag carts are known in the prior art. A typical example of such a golf bag cart is to be found in U.S. Pat. No. 2,236,053, which issued to S. Caron on March 25, 1941. This patent discloses a golf bag cart which is adapted to transport a golf bag on a pair of unsprung cart wheels. U.S. Pat. No. 2,438,078, which issued to H. Sutphen on March 16, 1948, discloses a collapsible golf bag cart which includes a bench seat. The device is foldable to a compact position for transportation and storage. U.S. Pat. No. Des. 166,308, which issued to A. Grant on April 1, 1952, discloses a cart for a golf bag with a pair of unsprung pivotally attached cart wheels which may be folded for transportation purposes. U.S. Pat. No. 3,510,145, which issued to H. Yokers on May 5, 1970, discloses a golf bag cart which provides a golf bag mounted by a pair of resilient struts on a pair of cart wheels. A foot portion is provided at the bottom of the golf baq for abutment with the ground when the cart is at rest. U.S. Pat. No. 3,784,138, which issued to C. Herlinq et al on January 8, 1974, discloses a rotatable golf bag holder for use on various types of golf carts. The holder includes a rotatable base having a conventional golf bag and a rotatable ring assembly which encircles and clamps the top of the golf bag, permitting full 360 degree rotation of the holder and the bag.

While the above mentioned devices are suited for their intended usage, none of these devices provide a golf bag cart having a frame mounted by a pair of shock absorbers on cart wheels, and provided with a ratchet adjustable handle, an odometer and a collapsible umbrella. Inasmuch as the art is relatively crowded with respect to these various types of golf bag carts, it can be appreciated that there is a continuing need for and interest in improvements to such golf bag carts, and in this respect, the present invention addresses this need and interest.

SUMMARY OF THE INVENTION

In view of the foregoing disadvantages inherent in the known types of golf bag carts now present in the prior art, the present invention provides an improved golf bag cart. As such, the general purpose of the present invention, which will be described subsequently in greater detail, is to provide a new and improved golf bag cart which has all the advantages of the prior art golf bag carts and none of the disadvantages.

To attain this, a representative embodiment of the concepts of the present invention is illustrated in the drawinqs and makes use of a golf bag carried by a frame which is mounted by shock absorbers to a pair of wheels. An odometer is provided for measuring the distance walked by an individual pulling the cart. This allows the distance of a player's shot to be easily measured. A rubber bumper is provided on the bottom of the golf bag for allowing the bag to stand in two positions without damage. An adjustable handle may be folded for storage purposes. The golf bag includes a removable holder for storing a supply of golf balls. A retractable umbrella is provided for protection of the golf bag and the user.

There has thus been outlined, rather broadly, the more important features of the invention in order that the detailed description thereof that follows may be better understood, and in order that the present contribution to the art may be better appreciated. There are, of course additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is tberefore an object of the present invention to provide a new and improved golf bag cart which has all the advantages of the prior art golf bag carts and none of the disadvantages.

It is another object of the present invention to provide a new and improved golf bag cart which may be easily and efficiently manufactured and marketed.

It is a further object of the present invention to provide a new and improved golf bag cart which is of a durable and reliable construction.

An even further object of the present invention is to provide a new and improved golf bag cart which is susceptible of a low cost of manufacture with regard to both materials and labor, and which accordingly is then susceptible of low prices of sale to the consuming public, thereby making such golf bag carts economically available to the buying public.

Still yet another object of the present invention is to provide a new and improved golf bag cart which provides in the apparatuses and methods of the prior art some of the advantages thereof, while simultaneously overcoming some of the disadvantages normally associated therewith.

Still another object of the present invention is to provide a new and improved golf baq cart which includes shock mounted cart wheels for protecting a golfer's equipment and providing an added degree of comfort to the golfer.

Yet another object of the present invention is to provide a new and improved golf bag cart which utilizes an odometer to enable a golfer to conveniently measure the distance of his golf shots.

Even still another object of the present invention is to provide a new and improved golf bag cart which utilizes a ratchet adjustable handle which may be quickly adjusted to provide a maximum degree of comfort to the golfer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the golf bag cart of the present invention.

FIG. 2 is a side view of the golf bag cart of the present invention, folded to a compact condition for transportation.

FIG. 3 is a front view of the golf bag cart of the present invention, folded to an open operative position.

FIG. 4 is a top view of the golf club storage rack of the golf bag cart of the present invention.

FIG. 5 is a side view of the golf bag storage rack.

FIG. 6 is a cross sectional view detail view, taken along line 6—6 of FIG. 4, which illustrates the golf ball storage holder of the present invention.

FIG. 8 is a detail view illustrating the attachment of the shock mounting device to the golf bag.

FIG. 9 is a longitudinal cross sectional view, taken along line 9—9 of FIG. 7, which illustrates the internal construction of the shock mounting device.

FIG 10 is a detail view illustrating the adjustable mounting of the golf bag cart handle.

FIG. 11 is a cross sectional view, taken along line 11—11 of FIG. 10, which illustrates the constructional details of the adjustable handle mounting arrangement.

FIG. 12 is a detail view, partially in cross section, which illustrates the retractable umbrella mounting arrangement of the golf bag cart of the present invention.

FIG. 13 is an exploded perspective detail view illustrating the adjustable umbrella support pivotal connection.

FIG. 14 is a detail view illustrating the handle mounting plate.

FIG. 15 is a cross sectional view, taken along line 15—15 of FIG. 14, further illustrating the details of the handle mounting plate.

FIG. 16 is a side view of the ratchet tongue of the adjustable handle mounting arrangement.

FIG. 17 is a side view of the ratchet tongue of FIG. 16.

FIG. 18 is a partial detail view illustrating the ratchet mounting yoke.

FIG. 19 is a cross sectional view, taken along line 19—19 of FIG. 18, illustrating the constructional details of the ratchet mounting yoke.

DESCRIPTION OF THE PREFERRED EMBODIMENT

Figure 7:
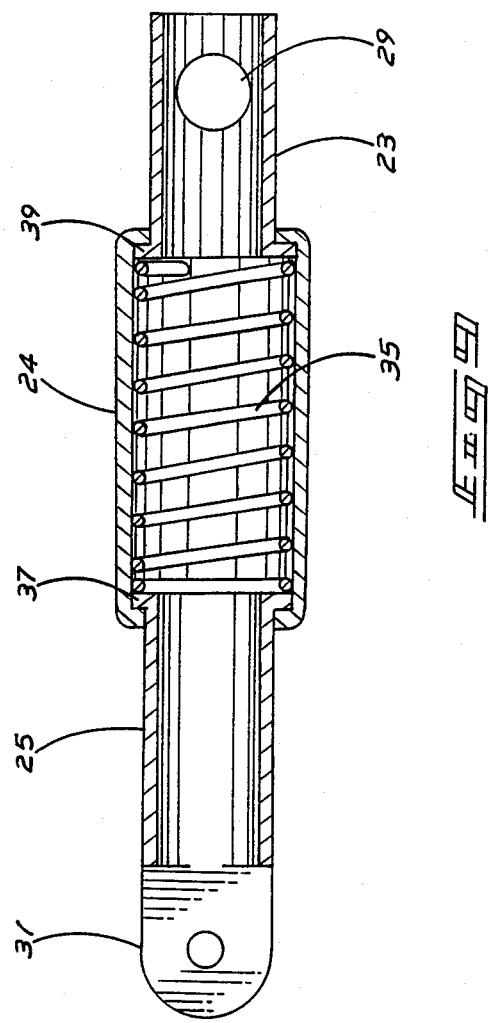
FIG. 7 as a detail view illustrating one of the cart wheel shock mounting devices of the present invention.

With reference now to the drawings, and in particular to FIG. 1 thereof, a new and improved golf bag cart embodying the principles and concepts of the present invention and generally designated by the reference numeral 10 will be described.

More specifically, it will be noted that the first embodiment 10 of the invention includes a cylindrical golf bag 12 which is provided with an elongated accessory pocket 14. The golf bag 12 may be formed in a conventional fashion from leather, plastic or a fabric material provided over a rigid frame. A pair of U-shaped rubber bumpers 16 and 18 are secured to front and back portions of the bottom 20 of the bag 12. The bag 12 is supported for transportation on a frame provided with a pair of cart wheels, one of which 22 may be seen in FIG. 1. Each of the cart wheels is mounted to the bag 12 by a shock absorber 24. The shock absorber 24 has a telescopically extending upper rod 25 which is secured by a clamping bolt 28 to a rigid U-shaped frame member 26. A similar U-shaped frame member 27 is secured in spaced relation adjacent the top end of the bag 12. An elongated hollow cylinder 30 is secured between the U-shaped frame members 26 and 27. The cylinder 30 houses a retractable umbrella 38 which is mounted for pivotal adjustment by supporting rods 32 and 36 which are pivotally connected at 34. A conventional cable driven odometer 42 has an actuating cable 40 which extends into operative engagement with the cart wheel 22. The odometer 42 is mounted adjacent the upper end of the bag 12 for ease of viewing. An adjustable mounting plate 44 is secured adjacent a midpoint of the upper U-shaped frame member 27. A ratchet tongue member 46 is secured to the mounting plate 44 in a manner to be subsequently described. The ratchet tongue member 46 is pivotally connected by a pin 48 within a slotted yoke portion of an elongated cylindrical handle bar 50. The handle bar 50 is provided with a hand grip portion 56 which is freely pivotally mounted by engagement of a tongue portion 54 within a slotted yoke portion at the upper end of the bar 5, via a pivot pin 52.

FIG. 2 provides a side view of the golf bag cart 10 of the present invention with the cart wheels folded to a retracted position and with the umbrella in a retracted storage position within the cylinder 30. The U-shaped frame members 26 and 27 may be secured to the bag 12 by conventional means such as threaded fasteners or through flexible belts or straps.

FIG. 3 provides a front view of the golf bag cart 10 of the present invention, with the spaced cart wheels 21 and 22 pivoted to an operative position. The cart wheels 21 and 22 are rotatably mounted on a rigid cylindrical axle 19 which extends through apertures 29 formed through lower telescoping rod portions 23 of the shock absorbing units 24.

FIG. 4 provides a top detail view of a compartmentalized golf club storage rack for use with the golf bag 12 of the present invention. The golf bag storage rack is of a generally conventional form which utilizes a rigid cylindrical plate 58 which is provided with a plurality of elongated axially extending hollow tubes 60 for the reception of the shafts of a plurality of golf clubs. A removable, elongated hollow cylindrical golf ball storage holder 62 extends axially through the plate 58. A resilient sheet metal retaining clip 64 extends above the plate 58 and allows a single golf ball to be easily removed from the storage holder 62.

FIG. 5 provides a side view of the golf club holder of FIG. 4.

FIG. 6 provides a partial cross sectional detail view illustrating the construction of the golf ball holder 62. As previously mentioned, the holder 62 is in the form of an elongated hollow cylindrical tube. A coil spring 66 is received within a bottom portion of the tube 62. A plurality of golf balls B are then inserted against the bias of the spring 66 into the tube 62. The golf balls B are retained within the tube 62 by a resilient sheet metal retaining clip 64. The spring constant of the spring 66 is carefully selected such that the weight of each additional golf ball will cause the spring 66 to compress an axial distance equal to the diameter of one golf ball B. In this fashion, regardless of the number of golf balls B within the tube 62, the uppermost golf ball B will be held in the illustrated position, in engagement with the inner surface of the resilient clip 64. In order to dispense a single golf ball B from the tube 62, it is merely necessary to slightly lift the free end portion of the clip 64 and remove a single golf ball B. After the removal of the top golf ball B, the next adjacent golf ball B will be raised into abutment with the clip 64 by virtue of the bias of the spring 66.

In FIG. 7, a side detail view is provided which illustrates one of the wheel mounting shock absorbers 24. The shock absorber 24 has a central hollow cylindrical section in which an upper rod 25 and a lower rod 23 are telescopically received. The upper rod 25 is provided with an apertured mounting tab 31 for securement to the U-shaped frame member 26 (FIG. 1) of the golf bag cart.

As shown in FIG. 8, the clamping bolt 28 is provided with an internally threaded bore which cooperates with a threaded fastener 33 secured on an inner surface of the golf bag 12. The threaded fastener 33 extends through the outer wall of the bag 12 and also through the U-shaped frame member 26. By tightening bolt 28, the mounting tab 31 of the shock absorber 24 may be secured in an adjusted position to the frame member 26. Alternatively, by slightly loosening the clamping bolt 28, the shock absorber 24 may be pivoted to a storage position with respect to the U-shaped frame member 26. The bottom telescoping rod 23 of the shock absorber 24 has a transverse cylindrical aperture 29 which rotatably receives the axle 19 (FIG. 3).

As shown in the cross sectional view of FIG. 9, the inner ends of the telescoping rod members 23 and 25 are provided with respective annular flange portions 39 and 37. Thus, the upper 25 and lower 23 telescoping rod members are retained for axial sliding movement with respect to the central shock absorber portion 24. A coil spring 35 is received within the central portion 24 and is in abutment with the annular flange portions 37 and 39 of the rods 25 and 23, respectively. Thus, the spring 35 provides a shock absorbing mounting for the golf bag cart 12.

In FIG. 10, a detail view is provided of the handle mounting plate 44. The handle mounting plate 44 is secured to the ratchet tongue member 46 which is retained in a slotted yoke portion 84 of the handle bar 50 by a pivot pin 48. A ratchet pawl release button 92 extends through a rectangular aperture in the handle bar 50.

As shown in the cross sectional view of FIG. 11, the ratchet tongue 46 is retained by a pair of radial projections 80 and 82 which are in engagement with actuate undercut slots 70 and 72 formed in the mounting plate 44. The opposite end of the ratchet tongue 46 is formed with a semi-circular array of ratchet teeth 76. The handle bar 50 is provided with a pawl 94 which may be moved into and out of engagement with any of the teeth 76. The pawl 94 is mounted by a stud 96 on a release button 92. The release button 92 is pivotally mounted by a pin 100 within the interior of the handle bar 5. A spring 99 biases the release button 92 and attached pawl 94 into engagement with the teeth 76. By depressing the outer surface 98 of the button 92, the pawl 94 may be moved upwardly, out of engagement with the teeth 76, allowing the handle bar 50 to be pivotally adjusted about the axis of the pivot pin 48.

FIG. 12 provides a cross sectional detail view which illustrates the umbrella storage cylinder 30. The umbrella storage cylinder 30 is provided with a hollow cylindrical central tube 51 which receives a mounting bar 55 for axial sliding movement. An enlarged diameter end 57 of the mounting bar 55 retains the mounting bar 55 within the tube 51. The bottom end of the tube 51 is secured to the bottom of the tube 30. Thus, an annular space 59 is formed around the tube 51 within the tube 30. The mounting bar 55 is pivotally connected at 34 to an intermediate support 32 which is pivotally connected by a similar connection 34 to an upper support 36 which supports the umbrella 38, as shown in FIG. 1. When the umbrella 38 is not in use, the mounting bar 55, the intermediate support 32 and upper support 36 are pivoted into generally parallel relation and the umbrella 38 is folded to a retracted condition. In this manner, all of these elements may be stored within the annular space 59 formed in the tube 30.

In FIG. 13, an exploded perspective detail view is provided which illustrates the pivotal connection 34. For example, the intermediate support 32 may be provided with a pivot yoke portion formed by integrally formed spaced cylindrical discs 43 and 45. The discs 43 and 45 have axially aligned threaded cylindrical apertures for engagement with a clamp belt 47. The upper support 36 may be provided with a cylindrical disc 41 which is provided with a oversized aperture which is received for free rotation on the threaded shank of the clamping screw 47. By tightening bolt 47, the disc 41 may be frictionally clamped between the discs 43 and 45, thus securing the support members 32 and 36 in the desired adjusted position.

FIG. 14 provides a front view of the handle mounting plate 44. The plate 44 has a central circular aperture 68 and diametrically opposed contiguously formed actuate undercut grooves 70 and 72.

FIG. 15 provides a cross sectional view illustrating the actuate undercut grooves 72 and 70 formed in the mounting plate 44.

The ratchet tongue 46 has an actuate end portion provided with a plurality of spaced ratchet teeth 76. The opposite end of the ratchet tongue 46 has a cylindrical base 78 provided with diametrically opposed radially projecting tabs 80 and 82.

FIG. 17 provides a side view of the ratchet tongue 46.

In FIG. 18, a detail view is provided which illustrates the slotted yoke portion 84 formed at the bottom end of the handle bar 50. A circular bore 86 extends through spaced yoke portions 88 and 90.

As shown in FIG. 19, the release button 92 is pivotally mounted by a pin 100 within the interior of the handle bar 50. The release button 92 has a pawl 94 which is secured by a stud 96 to the release button 92. The outer end 98 of the release button 92 extends through a rectangular aperture formed through the handle bar 50.

Thus, as shown in FIG. 11, the handle bar 50 may be pivoted and secured in any desired adjusted position by engagement of the pawl 94 with the teeth 76 of the ratchet tongue 46. The ratchet tongue 46 may be rotatably adjusted through a partial circular arc about the central axis of the aperture 68 of the mounting plate 44, as illustrated in FIG. 14. The radial tabs 80 and 82 (FIG. 16) of the ratchet tongue 46 are slidably received for adjustment along the extent of the actuate grooves 70 and 72. Thus, the handle bar 50 (FIG. 11) is mounted for independent pivotal adjustment about two perpendicular axes.

The previously described advantageous features of the golf bag cart of the present invention provide a degree of convenience and comfort to a golfer which is not afforded by the prior art golf bag devices.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A golf bag cart, comprising:
frame means;
bag means on said frame means;
a pair of wheels;
shock absorber means mounting said wheels on said frame means;
bumper means on a bottom end of said bag means;
handle means;
means adjustably mounting said handle means on said frame means;
an elongated hollow cylinder on said frame means;
a hollow tube centrally located within said cylinder;
a mounting rod received for sliding movement within said tube;
an intermediate support member pivotally mounted to said mounting rod;
an upper support member pivotally mounted to an upper end of said intermediate support member; and
a retractable umbrella on said upper support member.

2. The golf bag cart of claim 1, further comprising odometer means operatively connected to one of said wheels.

3. The golf bag cart of claim 1, wherein said bumper means comprises a pair of rubber bumpers secured at diametrically opposed locations adjacent front and back edges on a bottom surface of said bag means 4. The golf bag cart of claim 2, wherein said frame means comprises a pair of rigid U-shaped frame members secured in axially spaced parallel relation on said bag means.

5. The golf bag cart of claim 2, wherein said shock absorber means comprises a pair of shock absorbers having a hollow central cylindrical portion;
upper and lower rod members telescopically received within said central portion;
an enlarged annular flange formed on an inner end of each of said upper and lower rod members within said central portion; and
a coil spring within said central portion in abutment with said enlarged annular flanges 6. The golf bag cart of claim 1, further comprising means for holding a plurality of golf balls in said bag means.

7. The golf bag cart of claim 6, wherein said golf ball holding means comprises an elongated cylindrical tube;
a coil spring received in a bottom portion of said tube; and
a resilient retaining clip attached adjacent an upper end of said tube.

8. A golf bag cart, comprising:
frame means;
bag means on said frame means;
a pair of wheels;
shock absorber means mounting said wheels on said frame means;
bumper means on a bottom end of said bag means;
handle means;
means adjustably mounting said handle means on said frame means for adjustment about two perpendicular axes;
said handle mounting means comprising a mounting plate having a central circular aperture provided with diametrically opposed undercut actuate recesses;
a ratchet tongue having a first end provided with a circular base having diametrically opposed radially projecting tabs receiving for sliding movement in said actuate undercut recesses;
an opposite end of said ratchet tongue provided with a semi-circular array of spaced ratchet teeth;
a circular aperture formed through said mounting tongue adjacent said second end;
a handle bar having a slotted yoke portion;

a pivot pin pivotally mounting said second end of said ratchet tongue to said slotted yoke handle bar portion; and spring biased pawl means in said handle bar mounted for selective engagement with said ratchet tongue teeth.

9. The golf bag cart of claim 8, further comprising odometer means operatively connected to one of said wheels.

10. The golf bag cart of claim 8, wherein said bumper means comprises a pair of rubber bumpers secured at diametrically opposed locations adjacent front and back edges on a bottom surface of said bag means.

11. The golf bag cart of claim 8, wherein said frame means comprises a pair of rigid U-shaped frame members secured in axially spaced parallel relation on said bag means.

12. The golf bag cart of claim 8, wherein said shock absorber means comprises a pair of shock absorbers having a hollow central cylindrical portion;

upper and lower rod members telescopically received within said central portion;

an enlarged annular flange formed on an inner end of each of said upper and lower rod members within said central portion; and a coil spring within said central portion in abutment with said enlarged annular flanges.

13. The golf bag cart of claim 8, further comprising means for holding a plurality of golf balls in said bag means.

14. The golf bag cart of claim 8, wherein said golf ball holding means comprises an elongated cylindrical tube;

a coil spring received in a bottom portion of said tube; and a resilient retaining clip attached adjacent an upper end of said tube.

* * * * *